United States Patent
Hindin et al.

[11] 3,886,028
[45] May 27, 1975

[54] APPARATUS FOR RECAPPING TIRES WITH PRECURED TREAD RUBBER

[75] Inventors: Herbert B. Hindin, Alamo; Alfred E. Johnson, El Cerrito; Donald P. Knapp, San Francisco, all of Calif.

[73] Assignee: Oliver Tire & Rubber Company, Oakland, Calif.

[22] Filed: June 14, 1973

[21] Appl. No.: 369,975

[52] U.S. Cl. ............... 156/394; 156/96; 156/128; 156/129
[51] Int. Cl. ............... B29h 5/04; B29h 17/36
[58] Field of Search ....... 156/394 FM, 128, 129, 96, 156/110 R

[56] References Cited
UNITED STATES PATENTS

| | | | |
|---|---|---|---|
| 1,483,857 | 2/1924 | Fitzharris | 156/394 FM |
| 3,779,833 | 12/1973 | Reppel | 156/96 |

FOREIGN PATENTS OR APPLICATIONS

| | | | |
|---|---|---|---|
| 555,727 | 9/1943 | United Kingdom | 156/96 |

*Primary Examiner*—Clifton B. Cosby
*Attorney, Agent, or Firm*—Owen, Wickersham & Erickson

[57] ABSTRACT

Apparatus for recapping a tire with precured tread rubber comprises a multi-part rigid shell that surrounds the tire to be recapped and forms a toroidal chamber around it. A cylindrical tire retaining rim device located within the inner diameter of the tire has end portions and retainer members for engaging the tire beads, and means are provided for creating pressure within the tire. A flexible envelope having a U-shaped cross-section fits around the tire after a precured rubber strip has been wrapped around the prepared tire surface. The envelope extends radially inwardly from the tire and fits between the opposite inner walls of the shell and the end portions of the rim device. Sealing members are provided on either the shell walls or the end portions of the rim device. Means are provided for pressing the end flanges of the rim device and the shell walls together to seal the envelope by means of the sealing members. This seals the toroidal chamber as a heated fluid is allowed to circulate into it at a pressure less than the pressure within the tire. Any air trapped under the envelope between it and the precured rubber strip and from under the strip is allowed to escape through air passages formed by air bleeding material placed over the tread and the tire sidewalls and extending between the inside surface of the inner edge of the envelope and the end flanges of the rim device.

19 Claims, 15 Drawing Figures

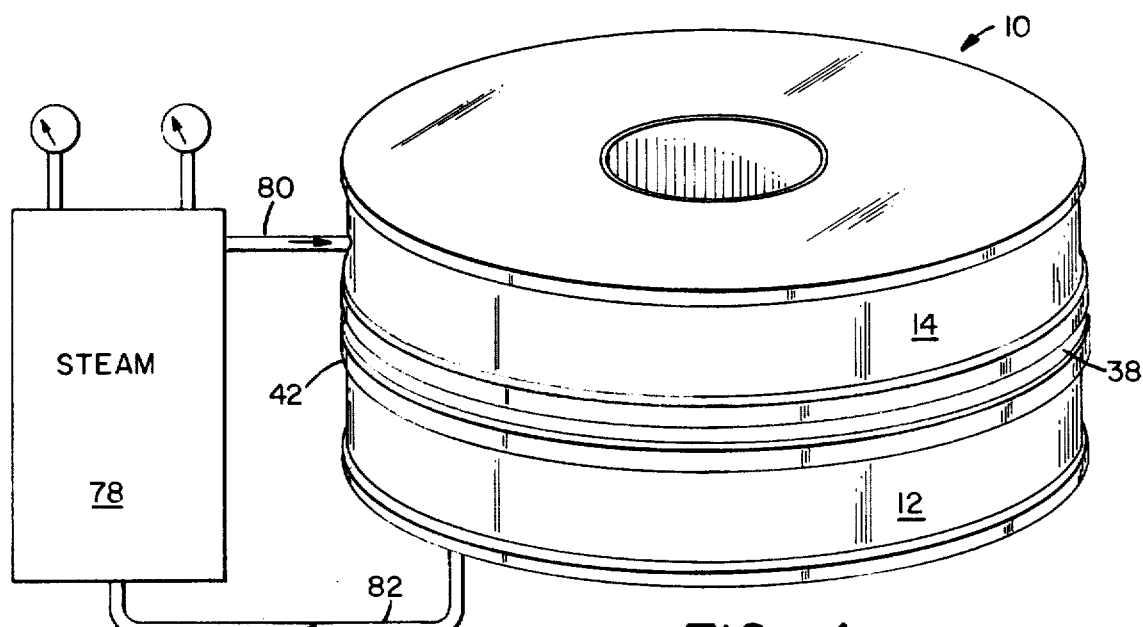
FIG_1
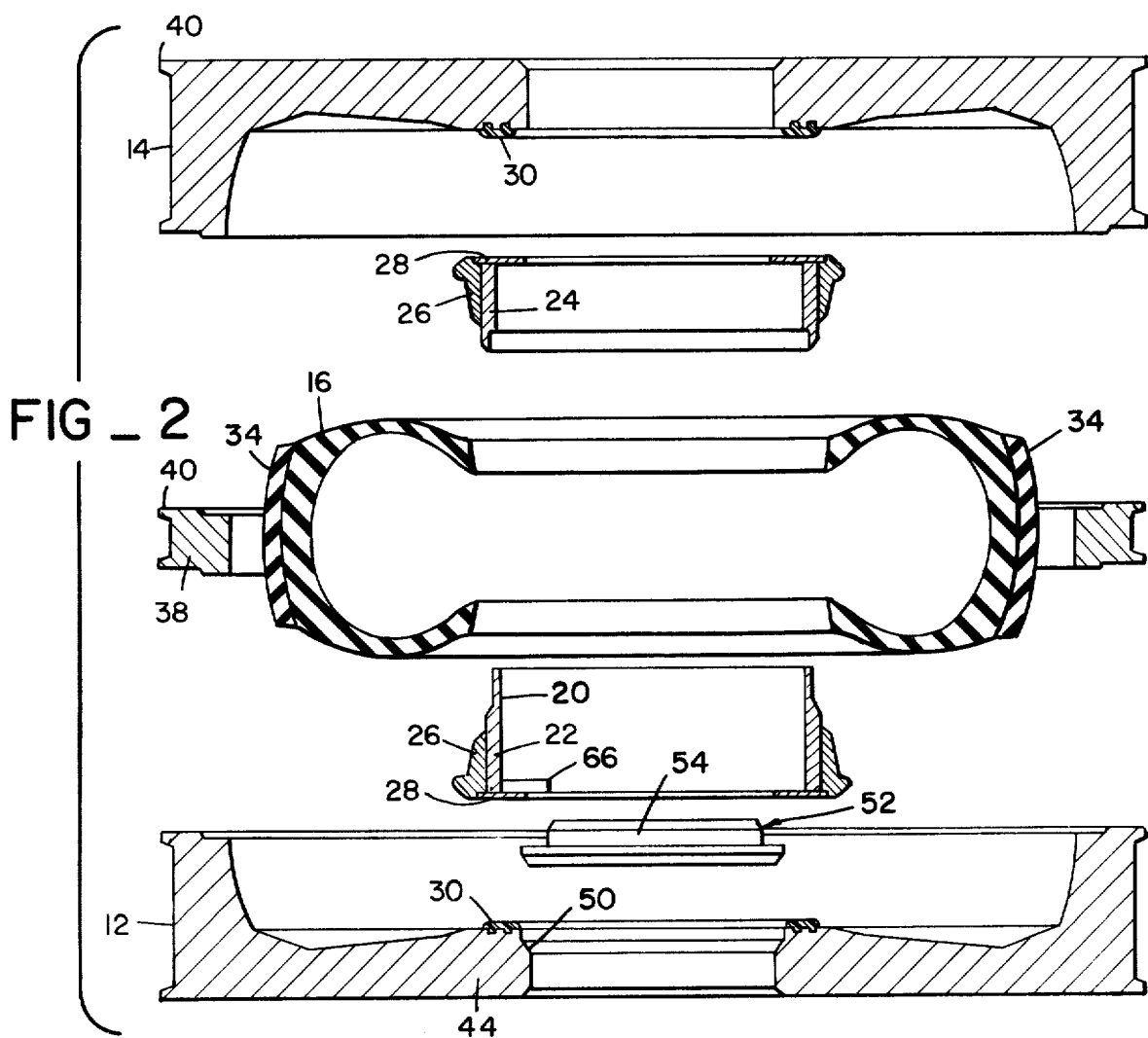
FIG_2

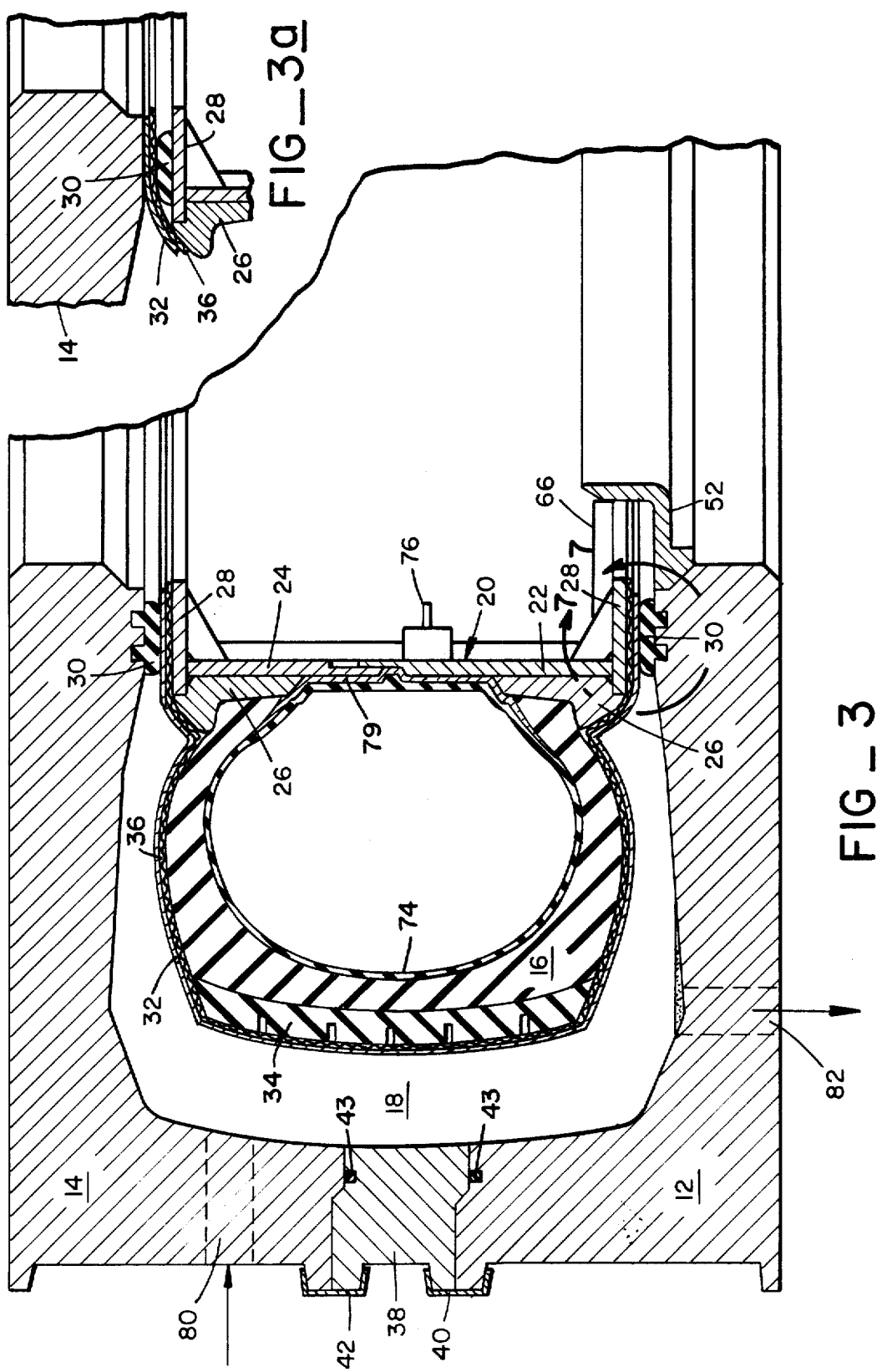

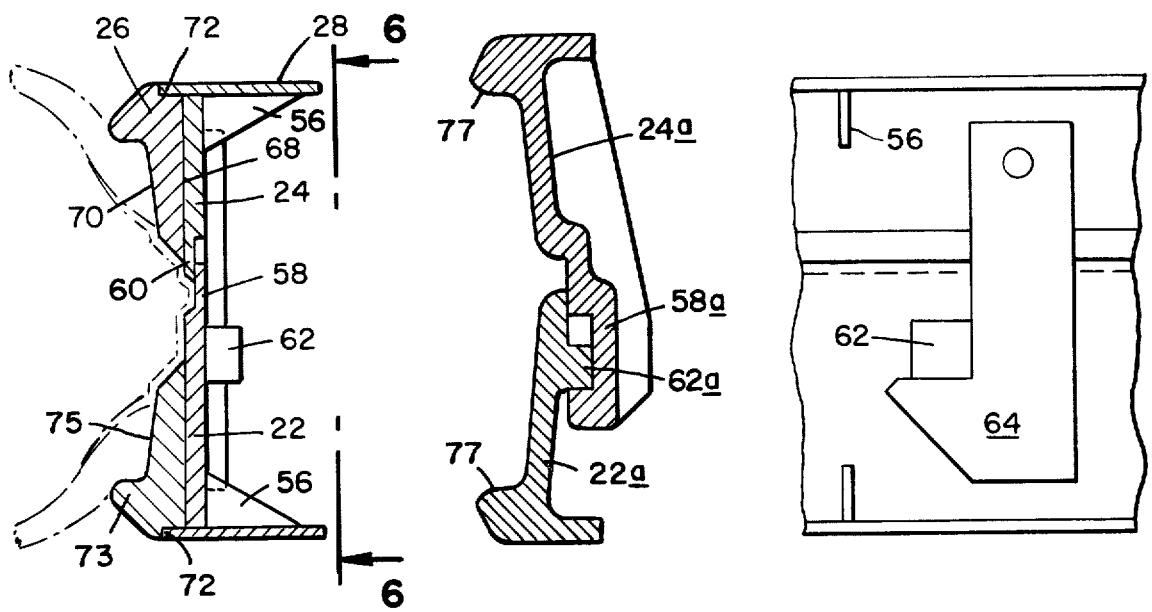
FIG_4  FIG_5  FIG_6
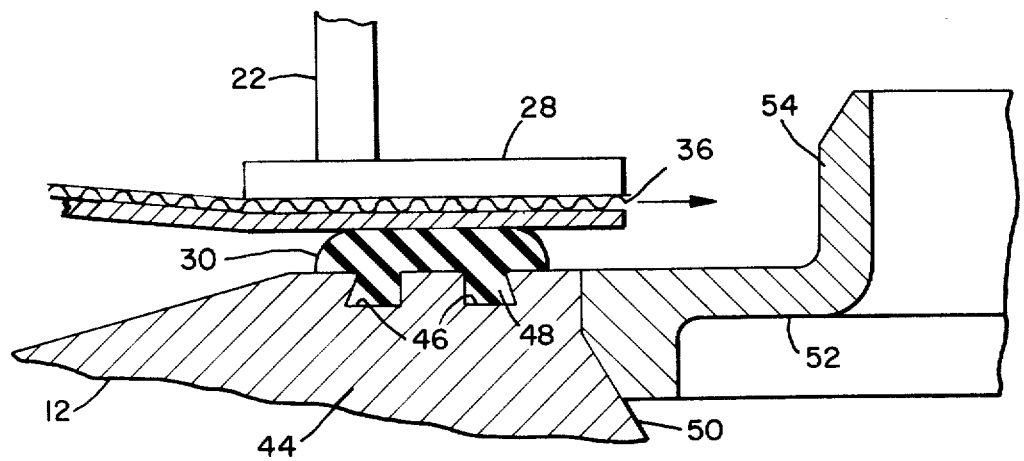
FIG_7
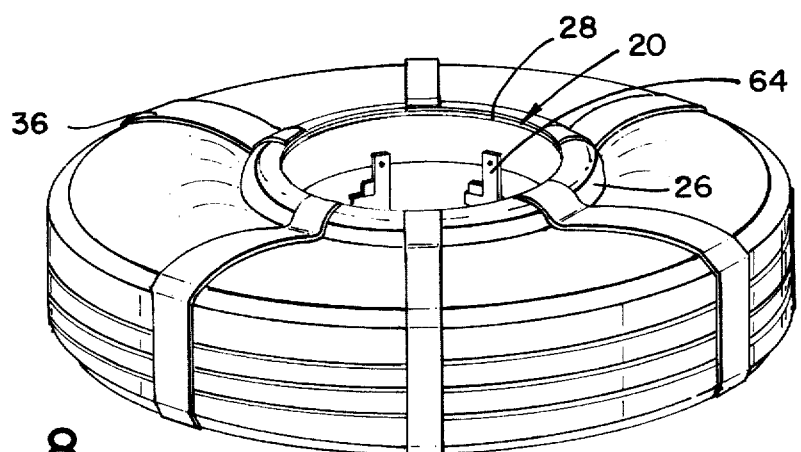
FIG_8

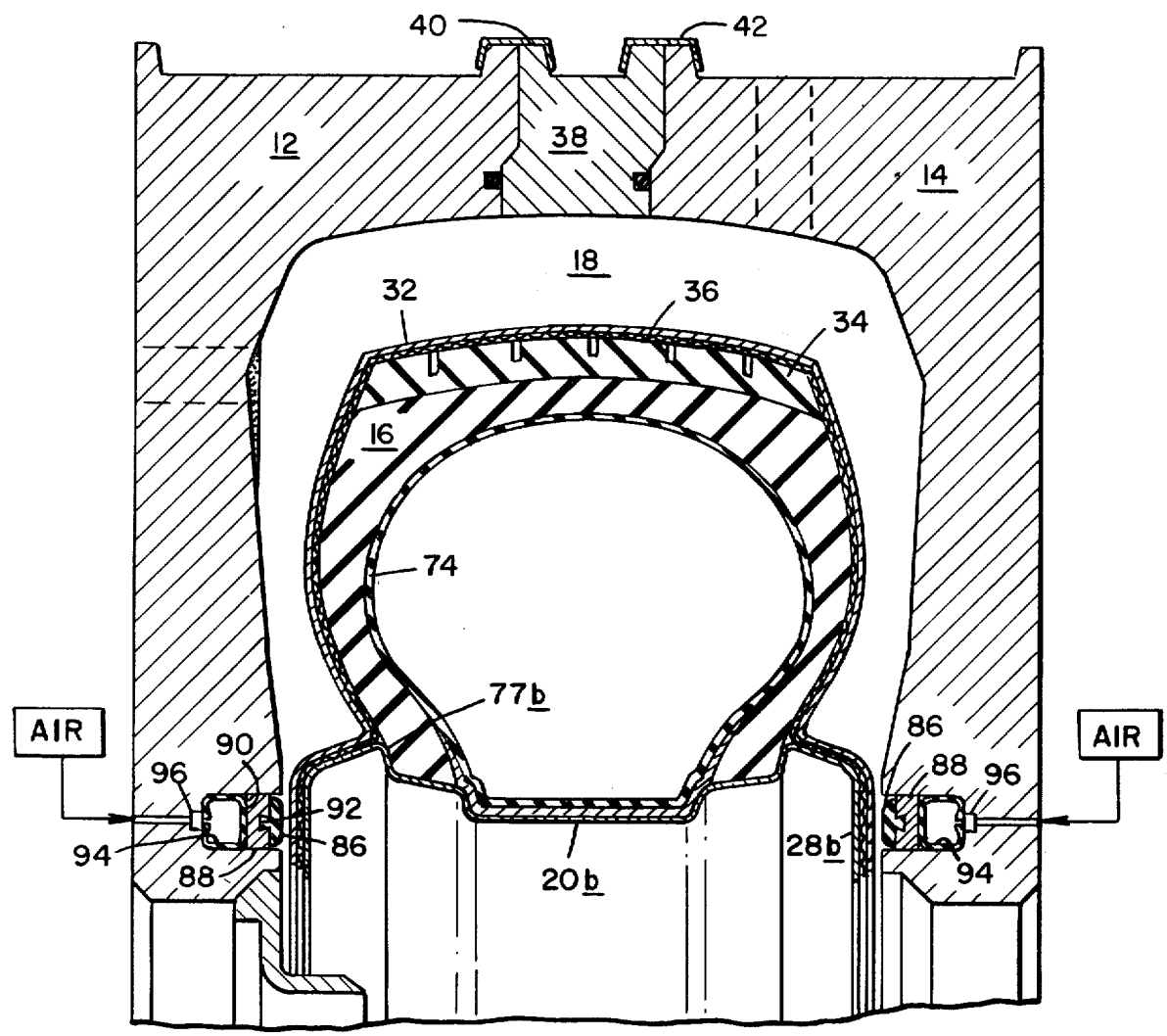
FIG _ 9
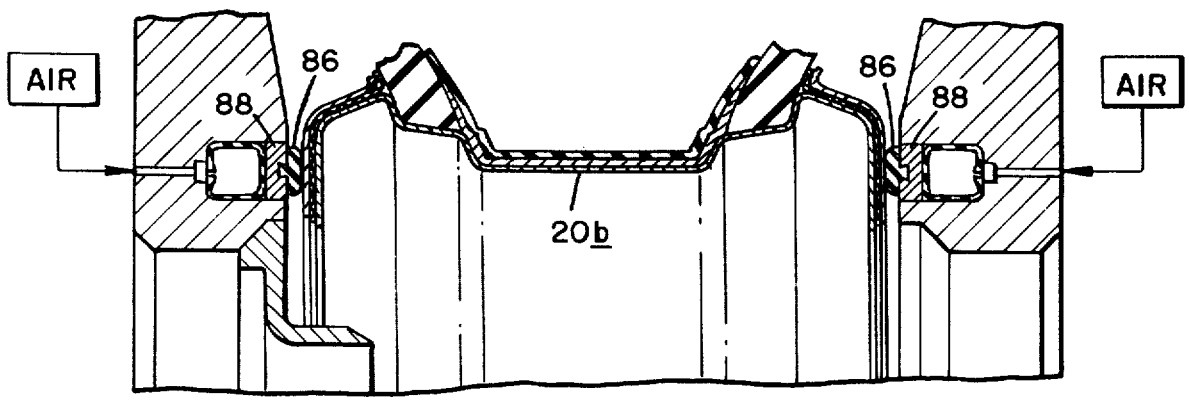
FIG _ 9a

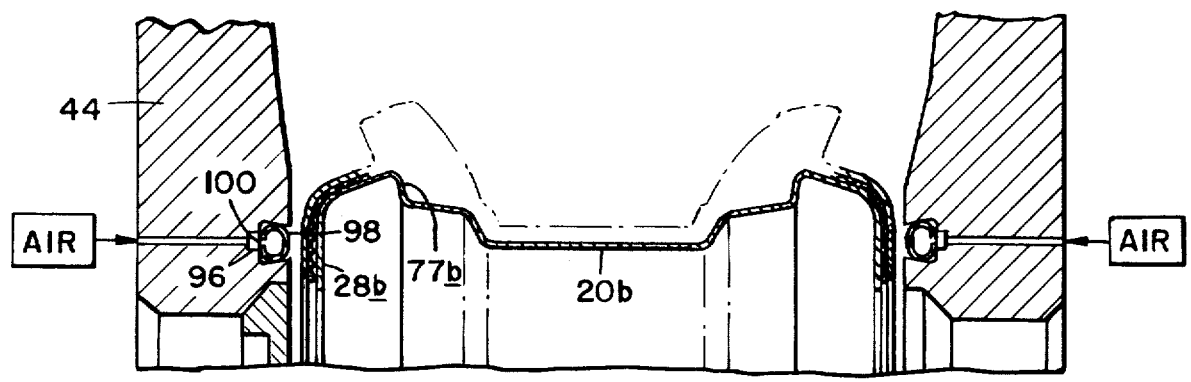
FIG_10
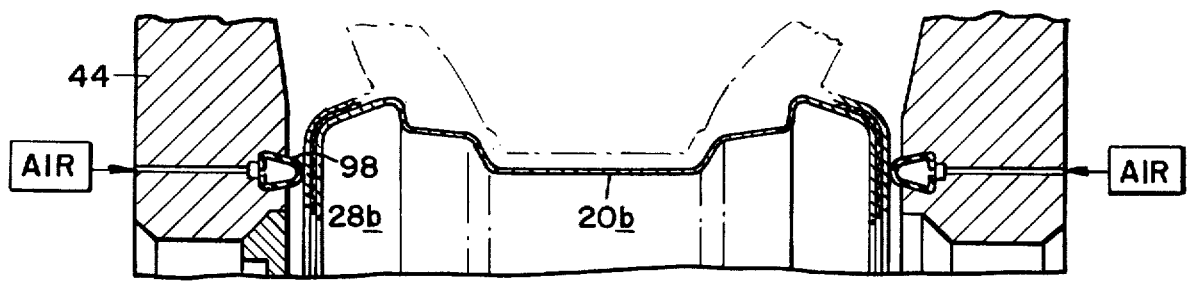
FIG_10a
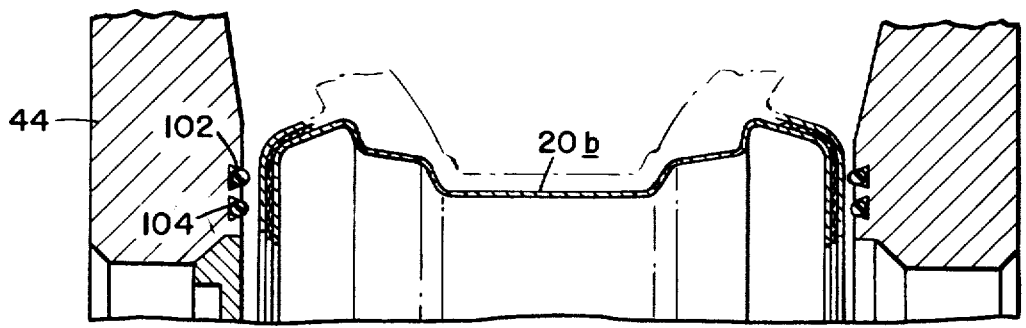
FIG_11
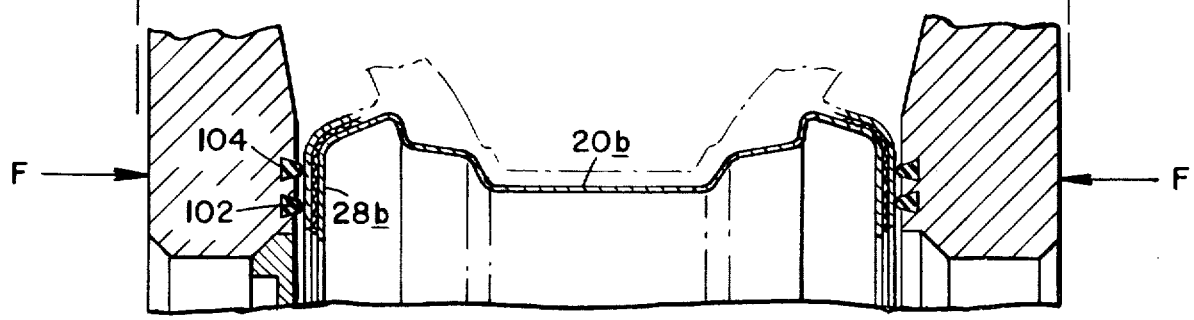
FIG_11a

APPARATUS FOR RECAPPING TIRES WITH PRECURED TREAD RUBBER

BACKGROUND OF THE INVENTION

In general, two methods for recapping tires have been used prior to the present invention. A more widely known and long used method entailed the use of uncured tread rubber which was wrapped around a prepared tire casing and then placed in the tire mold that provided temperature and radial pressure to cure the rubber. The mold directly engaged the tread rubber and formed the tread pattern as the curing process took place. The second method of tire recapping more recently developed, entailed the use of precured, tread rubber which was premolded in a strip form with its desired tread pattern. This precured tread strip was attached to a prepared tire casing and fluid pressure and heat was applied to the tread strip to bond it to the tire. One apparatus for accomplishing this precured recapping method is shown in detail in application Ser. No. 883,161 filed Dec. 8, 1969. In this apparatus, a flexible envelope was utilized to cover the precured tread rubber wrapped around the tire casing and this envelope extended from sidewall to sidewall of the tire. A curing module was used which formed a toroidal chamber around the tread rubber and had at least two sections with end portions that pressed against the tire sidewalls to form a seal between the envelope and the module section. When a heated fluid was supplied to the toroidal chamber it applied pressure to the envelope and hence to the tread rubber against the tire to bond it thereto after causing any trapped air under the tread strip to escape along the inner edges of the envelope. One disadvantage with the aforesaid arrangement was the necessity of maintaining a close dimensional relationship between the tire width and the sealing ribs of the shell in order to avoid any serious distortion of the tire during the recapping process. Such distortion, when excessive, adversely affected the entire recapping job. Another problem arose from the fact that the aforesaid apparatus was not capable of accommodating the widest range of tire types and sizes. These and other problems have been solved by the improved apparatus of the present invention.

BRIEF SUMMARY OF THE INVENTION

In accordance with the present invention a tire recapping apparatus is provided wherein module sections are connected to form a module shell in combination with a tire retaining rim device that is located around the inner portion of the module. The device is attachable to the tire and has means to engage and retain the tire beads. End portions or flanges of the rim device are axially aligned with the inside walls of the shell and a sealing means is mounted on these walls or on the rim flanges. During the recapping process an annular flexible envelope having a U-shaped cross section is placed over the prepared tire having a tread strip wrapped around it ready to be bonded in place. The envelope extends radially inwardly between the sealing means of the module sections on opposite sides of the tire and the end flanges of the rim device. An inner tube, curing bag or some other suitable means of confining air is used within the tire to apply and maintain internal pressure during the recapping process. Before the retreading cycle commences, the end flanges of the rim device and the adjacent sealing means of the inner walls of the module sections are pressed together with the envelope between them thereby forming a sealed toroidal chamber around the envelope and the tire without distorting the normal shape of the tire. Alternative means for forming the envelope seal in accordance with our invention will be described in detail below. When the envelope seal is accomplished heated fluid such as steam is supplied to the toroidal chamber to provide pressure against the envelope and thereby press the precured tread strip against the tire surface. As this fluid pressure increases, any air trapped under the envelope or between the tread strip and the tire surface is forced out. This trapped air is allowed to escape into the atmosphere by air passage means preferably located under the envelope at intervals around the tire and extending between the envelope and the adjacent end flanges of the rim device and over the tread strip.

It is therefore a general object of the present invention to provide an improved apparatus for recapping tires with a premolded, precured strip of tread rubber.

Another object of the present invention is to provide an apparatus for recapping tires with premolded, precured tread rubber that will not distort the tire from its normal shape during the recapping process, thereby providing a more durable recapped tire.

A more specific object of the present invention is to provide an apparatus for recapping tires with premolded, precured tread rubber wherein a toroidal chamber is formed around the tire within which heat and pressure are provided to press the precured tread strip to the tire casing and wherein the sealing of the toroidal chamber is accomplished by annular sealing means located between the inner walls of a module shell and the end portions of a tire retaining rim device within the shell.

Another object of our invention is to provide an apparatus for recapping tires having the aforesaid structural combination and wherein the tire retaining rim device is extended by means of pressure within the tire to accomplish the sealing of the envelope that encloses the toroidal chamber.

Yet another object of our invention is to provide an apparatus for recapping tires having the aforesaid structural combination and wherein the sealing of the envelope to form the toroidal chamber is accomplished by an extensible or expandable annular sealing means on the walls of the module shell.

Another object of the present invention is to provide an improved apparatus for recapping tires with premolded precured tread rubber and one that can be adjusted to accommodate a wide range of tire sizes and types.

Another object of the present invention is to provide an apparatus for recapping tires with premolded, precured tread rubber that is easy to operate to accomplish recapping in relatively short time periods without requiring use of highly skilled labor.

Other objects, advantages and features of our invention will become apparent from the following detailed description taken with the accompanying drawings.

BRIEF DESCRIPTION OF THE DRAWING

FIG. 1 is a view in perspective of a tire recapping apparatus embodying the principles of the present invention;

FIG. 2 is an exploded view of the apparatus of FIG. 1;

FIG. 3 is an enlarged fragmentary view in section showing the apparatus of FIGS. 1 and 2 as it appears when a tire is being recapped;

FIG. 3a is a fragmentary view in section showing a modified form of our apparatus with a sealing ring mounted on the rim device;

FIG. 4 is a view in cross section of the rim device for the apparatus of FIGS. 1 - 3;

FIG. 5 is a fragmentary view in section of a modified rim device with integral bead retaining means;

FIG. 6 is a fragmentary view of the curing rim taken along line 6—6 of FIG. 4;

FIG. 7 is a further enlarged fragmentary view in cross section taken at line 7—7 of FIG. 3;

FIG. 8 is a view in perspective of a tire assembly to be recapped showing the arrangement of air bleeding means before the envelope has been installed;

FIG. 9 is a fragmentary view in section similar to FIG. 3 and showing a modified form of our apparatus with an extensible sealing means and a nonextensible rim device;

FIG. 9a is a fragmentary view in section showing the sealing means of FIG. 9 in the sealing position;

FIG. 10 is a fragmentary view in section of another form of sealing means comprising an expandable gasket;

FIG. 10a is a view similar to FIG. 10 showing the gasket in the sealing position;

FIG. 11 is a fragmentary view in section showing another modified form of sealing means for our apparatus; and FIG. 11a is a view similar to FIG. 11 showing the sealing means in sealing position by means of external forces applied during the recapping process.

DETAILED DESCRIPTION OF EMBODIMENTS

With reference to the drawing, FIGS. 1 - 3 show one form of an apparatus 10 for recapping tires according to the principles of the present invention. Generally, it comprises a pair of upper and lower rigid shell sections 12 and 14 that are connectable together to form a curing module or shell within which a tire 16 is supported and a toroidal chamber 18 is formed around the tire. As shown in FIG. 2, a cylindrical tire retaining rim device 20 is positioned inside of the tire to be recapped, and in this embodiment it has two overlapping sections 22 and 24 which enable it to be adjustable or extendable in width in a direction along its central axis. A pair of spaced apart bead retaining members 26 are attached to the outer surface of the curing rim for holding the tire in place and in its normal shape during the recapping process. At the outer end of each rim section is a flange 28 which is axially aligned with an inner sealing ring 30 attached to an inner wall of one module or shell section. When the apparatus 10 is used during a recapping cycle, as shown in FIG. 3, a flexible envelope 32 is placed around the tire 16 to which a precured tread strip 34 was previously attached. The envelope extends inwardly past the edges of the tread strip and also inwardly over the tire sidewalls between the curing rim flanges 28 and the sealing rings 30 on the mold or shell sections 12 and 14. During a recapping cycle with this embodiment, the overlapped rim sections 22 and 24 move axially relative to each other in response to internal pressure applied to the tire. As this occurs, both rim flanges are caused to press the envelope against the adjacent sealing ring 30 to form a fluid tight seal for the toroidal pressure chamber 18. Yet, between the inside of the envelope and the rim flange an air passage means 36 is provided to allow any air trapped between the envelope and the tread strip or under the tread strip to escape. The air passage means 36 may comprise any suitable material that serves to provide and maintain small openings between the inside surface of the envelope and the end flanges of the curing rim. For example, circumferentially spaced apart strips of a woven-mesh cloth material such as a nylon mesh or the like may be placed under the envelope so that they extend from one rim flange to the other up over the surface of the tire tread (See FIG. 8).

Now, describing the multi-part module in greater detail, the module members or shell sections 12 and 14 are preferably formed from a suitable material of sufficient strength and durability to withstand the pressure and temperature of a heated fluid such as steam which is used in the toroidal chamber. Generally, such module members may be cast or fabricated from a high strength metal such as aluminum. A spacer section 38 between the sections 12 and 14 may be used to increase the module width and thereby accommodate larger tires. Outwardly extending flanges 40 are provided at the end edges of the shell sections and the spacer section so that standard lock rings 42 can be used to extend around adjacent such flanges and hold the assembly together as shown in FIGS. 1 and 3. The radially inwardly extending annular wall portion 44 of each shell section is sufficiently long so that it normally extends inwardly well beyond the sidewall of the tire being recapped. Seated on the inner surface of each inner wall portion is a sealing ring 30 made of a yieldable elastomeric material. In the embodiment of FIGS. 2 - 7, a pair of spaced apart annular grooves 46 are shaped to receive similarly spaced apart annular ridge portions 48 that extend downwardly from the flat bottom side of a sealing ring 30 which has a curved upper surface. In cross section, the grooves 46 are preferably divergent inwardly and the sealing ring ridges 48 are similarly shaped but slightly larger so that when forced into the grooves they provide a firm gripping means for each sealing ring to hold it in place on its module or shell section.

The overlapping sections 22 and 24 of the rim device, as shown in detail in FIGS. 4 and 6, are each essentially a cylindrical band portion made of a rigid material with an annular end flange 28 attached to it. The latter flanges may be reinforced by circumferentially spaced apart members 56 welded in place to the adjacent band portion. These flanges also have the same nominal diameter but are somewhat wider than the sealing rings 30 and are generally in a plane that is perpendicular to the axis of the module shell sections. The band portions of the rim sections have thinner portions 58 and 60 along their inner edges that overlap and thus are movable axially relative to each other to vary the overall effective length of the sealing rim between its end flanges. Circumferentially spaced apart on the inner surface of one band section are a series of studs 62, and on the other band section are a series of similarly spaced apart hook shaped members 64. The latter are axially aligned with the studs and are located so the studs can engage the members 64 to limit the extension of the band sections, as shown in FIG. 6.

The tire bead retaining members 26 attached to the outer side of the rim device 20 adjacent its end flanges 28 are essentially circular rings which can have various cross sectional shapes depending on the type of tire being recapped and its bead configuration. For example, in the example shown in FIGS. 3 and 4 each bead retaining member is a separate ring like member that fits on the rim device and has a bottom or inner cylindrical surface 68 that lies flush against the rim surface and an outer slightly conical surface 70 that slopes inwardly toward its bottom surface, thereby forming a wedge shaped cross section that engages the similarly beveled inner edges of the tire bead. The outer edge of the bead retaining members are preferably provided with a notched out portion 72 to engage the flange and a radially outwardly extending portion 73 adapted to press against the outer surface of the tire near the edge of its bead. This portion 73 has a conical outer surface 75 that extends inwardly at an angle towards the tire wall which is large enough to prevent any crimping or sharp bends in the envelope during the curing cycle, as shown in FIG. 3. Bead retaining members having somewhat different cross sectional shapes may be used on the curing rim for various other types of tires. For example, in FIG. 5, a rim device 20a is shown having a shape that affords spaced apart shoulders 77 which are essentially integral bead retaining members. These shoulders are formed as part of two relatively slidable rim device members 22a and 24a having overlapped inner portions. One inner portion has spaced apart stop members 62a which engage a hook like portion 58a on the other inner portion to limit maximum extension as with the rim device 20.

On the lowermost mold section 12, as shown in FIG. 2, the radially inwardly extending annular end wall portion 44 extends inwardly beyond the sealing ring 30 and forms a tapered inner surface 50 that engages a matching tapered surface on the base portion of a circular centering plate 52. This allows the centering plate to seat itself in the central opening of the lower mold section so that a cylindrical portion 54 of the centering plate extends axially upwardly. Fixed to the end flange 28 of the lowermost band section on the curing rim 20 are a series of circumferentially spaced apart tab members 66 that extend radially inwardly toward the central axis of the rim device. The length of these latter tabs is such that their inner ends terminate on a circle having a slightly larger diameter than the cylindrical portion 54 of the centering plate 52. Thus, they serve to center the rim device, and hence the tire being recapped precisely within the lower mold section 12. Other centering devices could be used for locating the rim device within the mold, if desired.

To assemble the apparatus 10 shown in FIGS. 1 – 3 for use, the lower mold section 12 is positioned first on a suitable horizontal support with its sealing ring 30 in place. The centering plate 52 may then be installed with its lower conical surface in contact with the matching inner conical surface 50 at the inner edge of the lower mold section. Now, the rim device 20 with its two adjustable sections 22 and 24 are placed inside of the tire 16 to be recapped and the tire is positioned so that the bead retaining members 26 are against the tire beads.

Although in FIGS. 1 – 3, the sealing ring 30 is shown mounted on the inner walls 44 of the module shells, it could be mounted on the end portions of the rim device 20, as shown in FIG. 3a. In this case the inner walls of each shell could have a relatively smooth surface, although a more favorable sealing action against the envelope may be achieved by providing the inner wall surface with a slightly convex surface.

Before the tire is mounted on the rim device it is prepared for recapping in the normal manner by buffing the outer surface of the casing to remove the old tread. The strip or band of premolded, precured tread rubber is then placed around the tire with a thin layer of uncured bonding cement and/or uncured rubber cushion between the tread rubber and tire. A conventional curing bag or inner tube 74 or some other sealing means (such as an inner liner in the case of tubeless tires) is provided inside the tire for the purpose of retaining a pressurized fluid within the tire. A flap like liner 79 may be used on the outside of the rim device to prevent any crimping of the curing bag or inner tube. A valve stem 76 from the curing bag or tube extends through the band section 22 of the curing rim 20, or if the tire is tubeless, the valve stem may be connected directly to the rim. Now the flexible envelope 32 is fitted around the tire so that it extends inwardly around and over the tire sidewalls and flush against the flanges 28 of the curing rim 20, as shown in FIG. 3. This entire assembly of tire, rim device and envelope is now placed inside the lower mold or shell section 12 and is automatically centered therein by the centering tabs 66 that engage the cylindrical portion of the centering plate. The mold spacer ring 38 and the upper mold or shell section 14 can now be connected together by the lock rings 42 to form the complete module. O-rings 43 are utilized to maintain a fluid tight connection between the module sections. At this point, the envelope extends between both of the sealing rings 30 and their respective adjacent curing rim flanges 28.

To commence the recapping process with our apparatus 10, air pressure (e.g., 75 psi) is first applied to the bag or tube 74 inside of the tire. In the embodiment of FIGS. 3 – 7, this causes the two rim sections 22 and 24 to move axially outwardly until each of their flanges 28 bears against the envelope 32 and forces it against a sealing ring 30. Now, as shown in FIG. 1, a fluid such as steam, supplying both heat and pressure, is applied from a suitable source such as a steam generator 78 through an inlet 80 into the toroidal chamber 18 formed around the envelope by the connected shell sections. The pressure builds up in this chamber because of the sealing force of the rim flanges against the sealing rings 30 and prevents any escape of steam from around the inner edges of the envelope. Once the maximum pressure has been reached, overflow steam is allowed to flow through an outlet 82 back to the fluid pressure source 78 or into the atmosphere. The pressure in chamber 18 is maintained at a lower level than the internal pressure within the tire by some predetermined amount. This pressure differential can vary according to the type of tire being recapped but must be great enough to overcome the thermal shrinkage forces that occur on the internal organic fibers of the tire. For example, in passenger vehicle tires a difference of 15 to 20 psi is adequate, whereas for larger truck tires the difference may be 30 to 40 psi. During the curing cycle which, depending on the size of the tire and the curing temperature (e.g., 320° F.), may last from 15 to 120 minutes, the pressure in the module chamber 18 acts uniformly on the envelope to force out from under it any air bubbles. The envelope in turn presses against the tread rubber with a uniform pressure radially inwardly to force any air bubbles under the tread strip to move outwardly and toward the inner edges of the envelope. As previously described the air passage material 36 between the inside of the envelope and the outer surface of the end flanges allows this trapped air to escape into the atmosphere.

It is apparent that an important aspect of the precured retreading process according to our invention is forming and maintaining a fluid tight seal between the envelope and the inner walls of the shell members by means of the rim device during the entire retreading cycle. The embodiment of FIGS. 2 – 7 is one form of this sealing means using the extensible curing rim 20. However, other forms of such a sealing means of equal effectiveness may be provided within the scope of our invention.

In FIG. 9 another embodiment of an envelope sealing means is shown wherein a movable sealing gasket 86 is mounted within each of the mold shell halves. Each gasket 86 is fixed to an annular member 88 that is slidably retained in an annular groove 90 formed in the inner sidewall of each mold shell half. The gasket 86 may be made of elastomeric material similar to the gasket 30 and is secured to the outer surface of the annular member by means of a projection 92 which fits within a similarly shaped recess of the annular member. The inner surface of the annular member within the groove 90 is adjacent to an inflatable tube 94 situated at the bottom thereof. A suitable valve 96 and an air passage from this tube extends outwardly to the outer surface of the shell half. In this embodiment, a one-piece rim device 20b can be used having integral bead retaining shoulders 77b and end flanges 28b or end portions which extend substantially but not quite to the inner wall surfaces of the two shell halves. Thus, during the retreading cycle, fluid pressure applied to the valves 96 for the inflatable tubes 94 will cause the annular members 88 to move outwardly within their respective grooves, as shown in FIG. 9a, thereby pushing the gaskets 86 against the end flanges or portions of the curing rim 20b. With the envelope between each gasket and rim flange a seal is accomplished that prevents any escape of fluid pressure from the chamber 18.

In yet another embodiment of our invention shown in FIG. 10, a seal for the chamber 18 may be provided by means of an inflatable gasket 98 retained with an annular groove 100 in the inner side wall of each of the shell halves. Each of the grooves 100 in cross section preferably has inwardly divergent side walls so as to retain the inflatable gasket 98 which is connected by a valve 96 and air passage extending through the wall of the mold shell. Here again, a one-piece curing rim 20b may be used whose length is such that its end flanges 28b are located close to the inner wall surfaces of the shell halves. Thus, when fluid pressure is supplied to the inflatable gaskets 98 they will bulge outwardly from their respective grooves 100, as shown in FIG. 10a, and form a fluid sealing engagement with the ends 28b of the curing rim 20b.

In still another modified form of our invention the sealing between the shell halves and the envelope between the ends of a fixed rim device of a predetermined size may be accomplished by applying an axial force to the mold shell halves that can be held by the locking rings 44 or some other module locking means. In this arrangement, as shown in FIG. 11, circular elastomeric sealing members 102 such as a pair of O-rings are seated in grooves 104 provided on the inner wall of each shell half and project outwardly from the grooves. Now, a rim device 20b with a tire assembly in place and covered by an envelope is positioned so that the rim end flanges 28 are essentially adjacent to the sealing members of each shell half. Here, the length of the rim device between its end flanges must be predetermined so that when the module shells are pressed axially and locked together, the sealing members 102 will move toward the end flanges of the rim device, as shown in FIG. 11a. Thus, an external axial force such as a press or any suitable means applied to the shell halves to bring them together will push the sealing members 102 against the curing rim end flanges and form the necessary seal with the envelope. When the shell halves are in this compressed position locking rings are installed on the shell halves and the retreading process can proceed. If desired, sealing members here could also be on the end portions of the rim device, as shown in FIG. 3a, instead of on the shell walls.

With all of our alternate sealing means as heretofore described, the envelope extends between the inner walls of the module shells and the rim device end flanges so that relative pressure between these components with one having a sealing member forms an adequate seal on the envelope for the toroidal chamber 18. Yet, in each instance the air passage means is provided on the inside of the envelope to allow air to bleed off during the retreading cycle. With this unique arrangement the present invention provides a tire recapping apparatus that is efficient, easy to operate and capable of precision recapping for a wide range of tire shapes and sizes. By using the end flanges or portions of the curing rim in cooperation with the inner walls of the shell halves for sealing the envelope to form the toroidal chamber 18, the need to apply a pressure directly against the tire sidewalls has been eliminated and the recapping process will take place without distortion of the tire casing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. Apparatus for retreading tires with a precured, premolded tread strip wherein a tire assembly is first formed from a tire casing with the precured tread strip placed around a bonding layer on the casing and the assembly is covered with a thin flexible envelope that extends radially inwardly along the sidewalls of the tire casing with an air bleeding means for evacuating trapped air provided between the surface of the tread strip and the flexible envelope, said apparatus comprising:

a. a multi-part rigid shell for holding said tire and precured tread assembly, said shell being generally annular with a U-shaped cross section including end walls and defining a chamber located around the tread strip of the assembly;

b. a generally annular rim means located inside of said shell for supporting said tire and tread assembly and having rim portions that are axially extensible in response to pressure within the tire casing, each said rim portion having an end member adapted to extend adjacent to an inner end wall surface of said shell when said envelope is between said end members of said rim means and said inner walls of said shell;

c. sealing means for providing a fluid-tight seal between the exterior surface of said flexible envelope and the inner end walls of said shell in the area adjacent said end portions of said rim means;

d. fluid inlet and exhaust means for admitting pressurized fluid within the chamber defined inside of said shell and around said tire assembly; and e. inlet means on said rim means for allowing the interior of said tire to be pressurized and thereby cause said cylindrical rim portions to extend axially and force said sealing means to seal said chamber around said tire assembly.

2. The apparatus as described in claim 1 wherein said axially extensible rim portions are slidable, overlapping cylindrical band portions, each end member thereon having an annular flange portion and a tire bead engaging portion.

3. The apparatus as described in claim 2 wherein said sealing means comprises an annular elastomeric member fixed to each said flange portion of the end member on each said rim means.

4. The apparatus as described in claim 2 wherein said sealing means comprises an annular elastomeric gasket mounted on each inner end wall of said shell in an area axially aligned with said flange members of said rim means and adapted to engage with the exterior surface of said envelope so as to be pressed thereto by said flange portions of said rim means when fluid pressure is applied to the interior of the tire casing.

5. The apparatus as described in claim 2 wherein each said end portion and said bead retaining member is integral with its said cylindrical band member.

6. The apparatus as described in claim 2 wherein said bead retaining members are symmetrical ring like members, each having a constant cross section with a generally radially outwardly extending portion adapted to engage one bead portion of the tire being recapped.

7. Apparatus for retreading tires comprising:
a. a treadless, multi-part toroidal module having a generally U-shaped cross-section, said module having annular end walls connected by a generally cylindrical wall and fluid inlet and exhaust means;
b. an annular rim means inside of said module having a pair of axially extensible members with spaced apart end portions;
c. a thin flexible envelope mounted within said module for covering a tire assembly prepared for retreading and supported on said rim means, said envelope extending from said end portions of said rim means around the outer perimeter of the tire;
d. sealing means for sealing each side of said flexible envelope to said toroidal module along said end portions of said rim means to thereby create an annular chamber between said liner and said mold;
e. means for maintaining a fluid pressure within said tire assembly and at least one inlet means extending through said rim means for inflating the interior of said tire assembly to a pressure equal to or greater than the pressure in said annular chamber; and
f. means for causing said sealing means to press said envelope against said end portions of said rim means and thereby form a fluid tight seal for said annular chamber when said rim means is extended axially in response to increased fluid pressure applied internally to said tire.

8. Apparatus for retreading tires with a precured, premolded tread strip wherein a tire assembly is first formed from a tire casing with the precured tread strip placed around a bonding layer on the casing and the assembly is covered with a thin flexible envelope that extends radially inwardly along the sidewalls of the tire casing with an air bleeding means for evacuating trapped air provided between the surface of the tread strip and the flexible envelope, said apparatus comprising:

a. a multi-part rigid shell for holding said tire and precured tread assembly, said shell being generally annular with a U-shaped cross section including end walls and defining a chamber located around the tread strip of the assembly;

b. a generally annular rim means inside of said shell for supporting said tire and tread assembly, said rim means having outer end members each extending adjacent to an inner end wall surface of said shell so that said envelope is adapted to extend between each end member of said rim means and an inner wall of said shell;

c. sealing means movable inwardly from said inner walls of said shell for providing a fluid-tight seal for said chamber between said flexible envelope, the inner end walls of said shell and said end members of said rim means;

d. fluid inlet and exhaust means for admitting pressurized fluid within the chamber defined inside of said shell and around said tire assembly; and e. inlet means on said rim means for allowing the interior of said tire to be pressurized.

9. The apparatus as described in claim 8 wherein said sealing means comprises a pair of inflatable tubes, each being seated within an annular slot on the inner wall of each said module shell and extendable axially when inflated to seal said envelope against the adjacent end portion of said rim means.

10. The apparatus as described in claim 10 wherein said sealing means comprises a pair of inflatable tubes, each being situated within an annular slot within the inner wall surface of said shell and connected to an annular sealing member of elastomeric material, said sealing member being movable outwardly from said slot into sealing engagement with said rim means when said tube is inflated.

11. The apparatus as described in claim 9 wherein said annular grooves on the inner wall surfaces of said module shells having inwardly divergent side walls to retain said inflatable gaskets.

12. Apparatus for retreading tires comprising:
a. a treadless, multi-part toroidal module having a generally U-shaped cross-section, said module having annular end walls connected by a generally cylindrical wall and fluid inlet and exhaust means;
b. an annular rim means inside of said module having axially spaced apart end portions;
c. a thin flexible envelope mounted within said module for covering a tire assembly prepared for retreading and supported on said rim means, said envelope extending from said end portions of said rim means around the outer perimeter of the tire;
d. sealing means for sealing each side of said flexible envelope to said toroidal module along said end portions of said rim means to thereby create an annular chamber between said liner and said mold;

e. means for maintaining a fluid pressure within said tire assembly and at least one inlet means extending through said rim means for inflating the interior of said tire assembly to a pressure equal to or greater than the pressure in said annular chamber;

f. means for causing said sealing means to press said envelope against said end portions of said rim means and thereby form a fluid tight seal for said annular chamber; and g. means for evacuating air from under said envelope around its inner edges adjacent said end portions of said rim means.

13. The apparatus as described in claim 8 wherein said sealing means comprises a circular gasket means seated on the inner surface of each said annular end wall, said rim means having end portions that extend closely to said gasket means, said gasket means being deformable when an axial external force is applied to said module thereby causing it to press said envelope against said rim end portions.

14. The apparatus as described in claim 8 wherein said rim means is a one piece member with integral end portions and shoulder means on its outer surface for retaining the beads of the tire being recapped.

15. The apparatus as described in claim 8 wherein said rim means has fixed end portions that extend closely adjacent to said sealing means, and said sealing means comprises a sealing member that is extendable axially from the inner surface of the module end walls to press against said envelope and said end portions of said rim means.

16. The apparatus as described in claim 8 wherein each said sealing member comprises an axially extendable non-inflatable gasket that is fixed to an inflatable tube seated within a slot formed in each module end wall.

17. The apparatus as described in claim 15 wherein each said sealing member comprises an inflatable gasket seated within a slot formed in each module end wall and which is extendable beyond the end wall surface when inflated.

18. Tire retreading apparatus as claimed in claim 8 wherein said sealing means comprises a pair of annular elastomeric gasket members mounted in the end walls of said toroidal mold.

19. Tire retreading apparatus as claimed in claim 8 including a centering plate centrally located and nested in one part of said multi-part module and having an axially extending cylindrical portion, and radially extending locator means on said rim means for positioning it coaxially with said module parts when the apparatus is assembled for use.

* * * * *